US007830901B2

(12) United States Patent
Rider et al.

(10) Patent No.: US 7,830,901 B2
(45) Date of Patent: Nov. 9, 2010

(54) RELIABLE NETWORK PACKET DISPATCHER WITH INTERLEAVING MULTI-PORT CIRCULAR RETRY QUEUE

(75) Inventors: Scot H. Rider, Pleasant Valley, NY (US); Todd A. Strader, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/686,408

(22) Filed: Mar. 15, 2007

(65) Prior Publication Data

US 2008/0225873 A1 Sep. 18, 2008

(51) Int. Cl.
*H04L 1/08* (2006.01)

(52) U.S. Cl. .................. 370/412; 709/203; 709/237; 709/249

(58) Field of Classification Search .............. 370/412, 370/235, 387; 709/230; 714/749, 746; 711/105
See application file for complete search history.

(56) References Cited

U.S. PATENT DOCUMENTS

| | | | |
|---|---|---|---|
| 5,265,103 A | 11/1993 | Brightwell | |
| 5,699,367 A | 12/1997 | Haartsen | |
| 6,035,348 A | 3/2000 | Webber et al. | |
| 6,337,860 B1 * | 1/2002 | Wicklund | 370/387 |
| 6,415,312 B1 | 7/2002 | Boivie | |
| 6,438,105 B1 | 8/2002 | Qarni et al. | |
| 6,581,116 B1 | 6/2003 | Arimilli et al. | |
| 6,724,762 B2 | 4/2004 | Garcia et al. | |
| 6,922,804 B2 * | 7/2005 | Das Sharma | 714/746 |
| 7,168,022 B2 | 1/2007 | Miyake et al. | |
| 7,450,512 B1 * | 11/2008 | Young et al. | 370/235 |

| | | | |
|---|---|---|---|
| 2002/0161842 A1 | 10/2002 | Larson et al. | |
| 2004/0264475 A1 | 12/2004 | Kowalski | |

(Continued)

FOREIGN PATENT DOCUMENTS

| | | |
|---|---|---|
| EP | 1 638 240 | 3/2006 |
| WO | WO 2006/035318 | 4/2006 |

OTHER PUBLICATIONS

Lin, Shu, et al., "Error Control Coding—Fundamentals and Applications," XP-002379344, Englewood Cliffs, Prentice Hall, Jan. 1, 1983, pp. 458-481.

(Continued)

*Primary Examiner*—Dang T Ton
*Assistant Examiner*—Lionel Preval
(74) *Attorney, Agent, or Firm*—Jeffrey N. Giunta; Fleit Gibbons Gutman BOngini & Bianco PL

(57) ABSTRACT

Disclosed is a method and apparatus for managing network data packet transmission. A retry buffer is maintained that includes a single first in, first out retransmission retry buffer. A first data packet is inserted into the retry buffer in response to transmitting the first data packet to a remote node. A determination that a second data packet is not able to be transmitted to the remote node causes the second data packet to be inserted into the retry buffer. A third data packet is retrieved from the retry buffer and a determination that it is not to be transmitted to the remote node causes the third data packet to be reinserted into the retry buffer.

20 Claims, 6 Drawing Sheets

U.S. PATENT DOCUMENTS

2005/0149665 A1* 7/2005 Wolrich et al. .............. 711/105
2005/0281243 A1 12/2005 Horn et al.
2005/0286526 A1 12/2005 Sood et al.
2006/0179392 A1* 8/2006 Ota ............................ 714/749
2007/0130353 A1* 6/2007 Chou et al. ................. 709/230

OTHER PUBLICATIONS

Wei, Li, et al., "A New Selective Retransmitted ARQ System," Global Telecommunications Conference, 1993.. IEEEE, Nov. 29, 1993, New York, NY, USA, XP010109955, pp. 1815-1821.

Benelli, Giuliano, et al., "New Modified Stop-and-Wait ARQ Protocols for Mobile Communications," Wireless Personal Communications, Springer, Dordrecht, NL, vol. 1, No. 2, Jan. 1, 1994, pp. 117-126, XP000511623.

Medeiros, J.C., et al., "Evaluation of a Stop and Wait Scheme with HF Data," Proceedings of the Gobal Telecommunications Conference and Exhibition, New York, IEEE, XP000794852, vol. 3, Dec. 1, 1985, pp. 1029-1033.

International Search Report for PCT/EP2008/051833 dated Jul. 9, 2008.

* cited by examiner

RELIABLE NETWORK PACKET DISPATCHER WITH INTERLEAVING MULTI-PORT CIRCULAR RETRY QUEUE

CROSS REFERENCE TO RELATED APPLICATION

This application is related to the application entitled "CONGESTION REDUCING RELIABLE TRANSPORT PACKET RETRY ENGINE", Ser. No. 11/686,417, which was filed on the same day as the present application and commonly assigned herewith to International Business Machines Corporation. This related application is incorporated herein by reference in its entirety.

FIELD OF THE INVENTION

The present invention generally relates to the field of transmitting data over a network, and more particularly relates to managing the dispatch of data packets across a network to one or more end points.

BACKGROUND OF THE INVENTION

Reliable transport protocols are used in networking systems to ensure data is correctly received when errors in the transmission occur. In general, reliable transport protocols assign sequence numbers packets to packets when the packets are first transmitted. When the packets are received at the destination (either next hop, or ultimate destination), the receiver transmits an acknowledgement packet back to the originator indicating which sequence number was received. Packets that are pending acknowledgement are typically placed into a requeue buffer. However, in a typical reliable packet transport system transmitter each receiving node has a dedicated requeue buffer, which is usually limited to a given number of data packets that can be outstanding. Therefore, these systems are not easily reconfigurable.

Therefore a need exists to overcome the problems with the prior art as discussed above.

SUMMARY OF THE INVENTION

Briefly, in accordance with the present invention, disclosed are a method, information processing system, and computer readable medium for managing transmission of data packets across a network. The method comprises maintaining a retry buffer. The retry buffer comprises a single first in, first out retransmission retry buffer that stores a plurality of data packets according to a respective packet sequence number for each data packet within the plurality of data packets. The first data packet is inserted into the retry buffer in response to transmitting a first data packet to a remote node. The method also includes determining that a second data packet, received from a data source, is not able to be transmitted to the remote node. The second data packet is inserted into the retry buffer in response to determining that the second data packet is not able to be transmitted to the remote node. A third data packet is retrieved from the retry buffer. The method further includes determining that a third data packet, the third data packet being retrieved from the retry buffer, is not to be transmitted to the remote node. The third data packet is reinserted into the retry buffer in response to determining that the third data packet is not to be transmitted to the remote node.

In another embodiment an information processing system for managing transmission of data packets across a network is disclosed. The information processing system includes a memory and a processor that is communicatively coupled to the memory. The information processing system also includes a data packet manager that is communicatively coupled to the memory and the processor. The data packet manager is for maintaining a retry buffer. The retry buffer comprises a single first in, first out retransmission retry buffer that stores a plurality of data packets according to a respective packet sequence number for each data packet within the plurality of data packets. The first data packet is inserted into the retry buffer in response to transmitting a first data packet to a remote node. The data packet manager is also for determining that a second data packet, received from a data source, is not able to be transmitted to the remote node. The second data packet is inserted into the retry buffer in response to determining that the second data packet is not able to be transmitted to the remote node. A third data packet is retrieved from the retry buffer. The data packet manager is further for determining that a third data packet, the third data packet being retrieved from the retry buffer, is not to be transmitted to the remote node. The third data packet is reinserted into the retry buffer in response to determining that the third data packet is not to be transmitted to the remote node.

In yet another embodiment, a computer readable medium for managing transmission of data packets across a network is disclosed. The computer readable medium includes instructions for maintaining a retry buffer. The retry buffer comprises a single first in, first out retransmission retry buffer that stores a plurality of data packets according to a respective packet sequence number for each data packet within the plurality of data packets. The first data packet is inserted into the retry buffer in response to transmitting a first data packet to a remote node. The computer readable medium also comprises instructions for determining that a second data packet, received from a data source, is not able to be transmitted to the remote node. The second data packet is inserted into the retry buffer in response to determining that the second data packet is not able to be transmitted to the remote node. A third data packet is retrieved from the retry buffer. The computer readable medium further includes instructions for determining that a third data packet, the third data packet being retrieved from the retry buffer, is not to be transmitted to the remote node. The third data packet is reinserted into the retry buffer in response to determining that the third data packet is not to be transmitted to the remote node.

One advantage of the present invention is that the multiple data packets can be dispatched to a transmit port, a requeue port or a purge port simultaneously. Another advantage is that a data packet buffer is not pre-allocated or dedicated to particular endpoints or packets. In other words, the packet buffer is shared between multiple endpoints and multiple streams of traffic. Also, the packet buffer is not limited to a number of packets that can be outstanding to any particular endpoint (besides the physical limit of the requeue buffer 302). Therefore, the present invention can be dynamically scaled for use in systems with many or few independent endpoints.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Network

Figure 1:
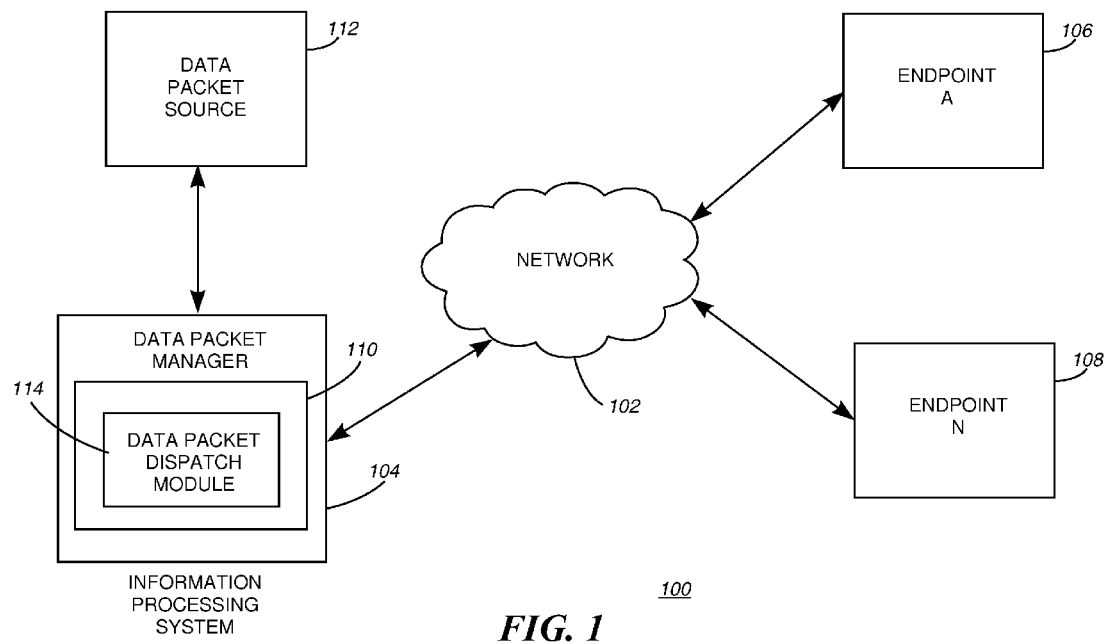
FIG. 1 is a block diagram illustrating an exemplary network for transmitting data packets according to an embodiment of the present invention.

According to an embodiment of the present invention, as shown in FIG. 1, an exemplary network 100 is shown. FIG. 1 shows a network 102 communicatively coupled to network nodes such as information processing system 104, endpoint A 106, and endpoint N 108. Each of the endpoints 106, 108 can be an information processing system, router, gateway, network hub, and the like. In other words, the endpoints 106, 108 are any network component destined to receive a transmitted data packet. In one embodiment, the endpoints 106, 108 are uncorrelated, i.e., they have different sets of sequence numbers between them and there is no ordering dependency between them.

The information processing system 104, in one embodiment, includes a data packet manager 110. The data packet manager 110 receives data packets for transmission to end points 106, 108, from a packet source 112 and reliably transmits the data packets to the endpoints 106, 108. The data packet manager 110 includes, among other things, a reliable data packet dispatch module 114 for reliably dispatching packets to the endpoints 106, 108. The packet source 112, in one embodiment, can be one or more information processing system communicatively coupled to the data packet manager 110. The packet source 112 can also be one or more processes that reside within the information processing system 104. For example, the packet source 112, in one embodiment, is an application that generates data packets to be sent to the endpoints 106, 108.

The data packet manager 110 uses one or more reliable transport protocols when transmitting a data packet to an endpoint 106, 108. Traditionally data packets are assigned ascending sequence numbers when they are first transmitted. When received at the destination (either next hop, or ultimate destination), the receiver transmits an acknowledgement packet ("ACK") back to the originator (e.g., the information processing system 104) indicating which sequence number was received. The acknowledgement allows the originator to determine that the transmitted packet arrived intact and in the correct order. The packet dispatch module 114 is discussed in greater detail below.

Data Packet Manager

Figure 2:
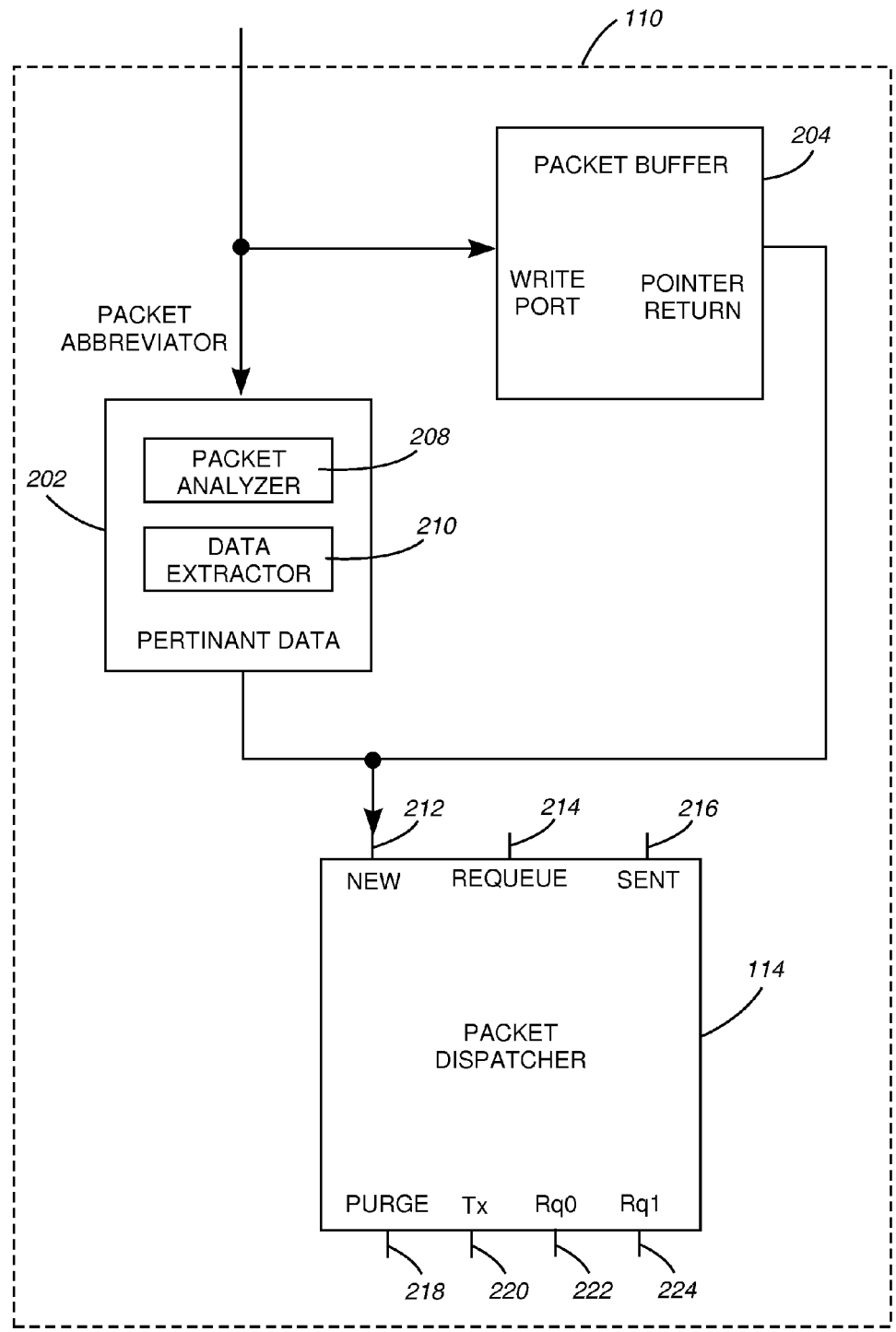
FIG. 2 is a block diagram of a data packet dispatch module according to an embodiment of the present invention.

FIG. 2 is a block diagram showing a more detailed view of the data packet manager 110 of FIG. 1. In one embodiment, the data packet manager 110 includes a packet abbreviator 202, a packet buffer 204, and a packet dispatcher 114. In one embodiment, the packet abbreviator 202 and the packet buffer 204 are separate components residing outside of the packet dispatch module 114. In this embodiment, the packet dispatch module 114 is part of the data packet manager 110. The packet buffer 204, in one embodiment is a memory that stores copies of packet information that is not used within the dispatch module 114 so that they can be retransmitted if necessary. One example of a data packet retransmission method is further discussed in the co-pending application entitled "CONGESTION REDUCING RELIABLE TRANSPORT PACKET RETRY ENGINE", Ser. No. 11/686,417, commonly assigned to International Business Machines Corporation, the entire contents and teachings of which are hereby fully incorporated herein by reference.

The packet abbreviator 202 receives packets from the packet source 112 for extracting relevant information to be sent to the packet dispatcher 114. For example, the packet abbreviator 202 includes a packet analyzer 208 and a data extractor 210. As the packet is received, the packet analyzer 208 analyzes the packet to determine, among other things, which endpoint 106, 108 to transmit the data packet to and which output port to send the packet to. The packet dispatcher 114, in one embodiment, includes a number of input ports 212, 214, 216 and output ports 218, 220, 222, 224, which are discussed in greater detail below.

The extracted data that is sent to the dispatcher 114 is referred to as a "digest". In other words, the "digest" is not the complete packet received by the packet abbreviator 202. The remaining packet information is stored in the packet buffer 204. The digest includes a pointer to a corresponding packet data in the packet buffer 204 that is not sent to the dispatcher 114. A number of cycles may be needed in order to retrieve enough information needed to determine what needs to be done with a received data packet. Therefore, the packets are pipelined. The following discussion discusses the processing of "packets" by various embodiments of the invention. In order to simplify understanding of the processing being described, the term "packet" is used to describe the message processing when, in fact, the processing is only handling the "digests" as described above.

Packet Dispatcher

Figure 3:
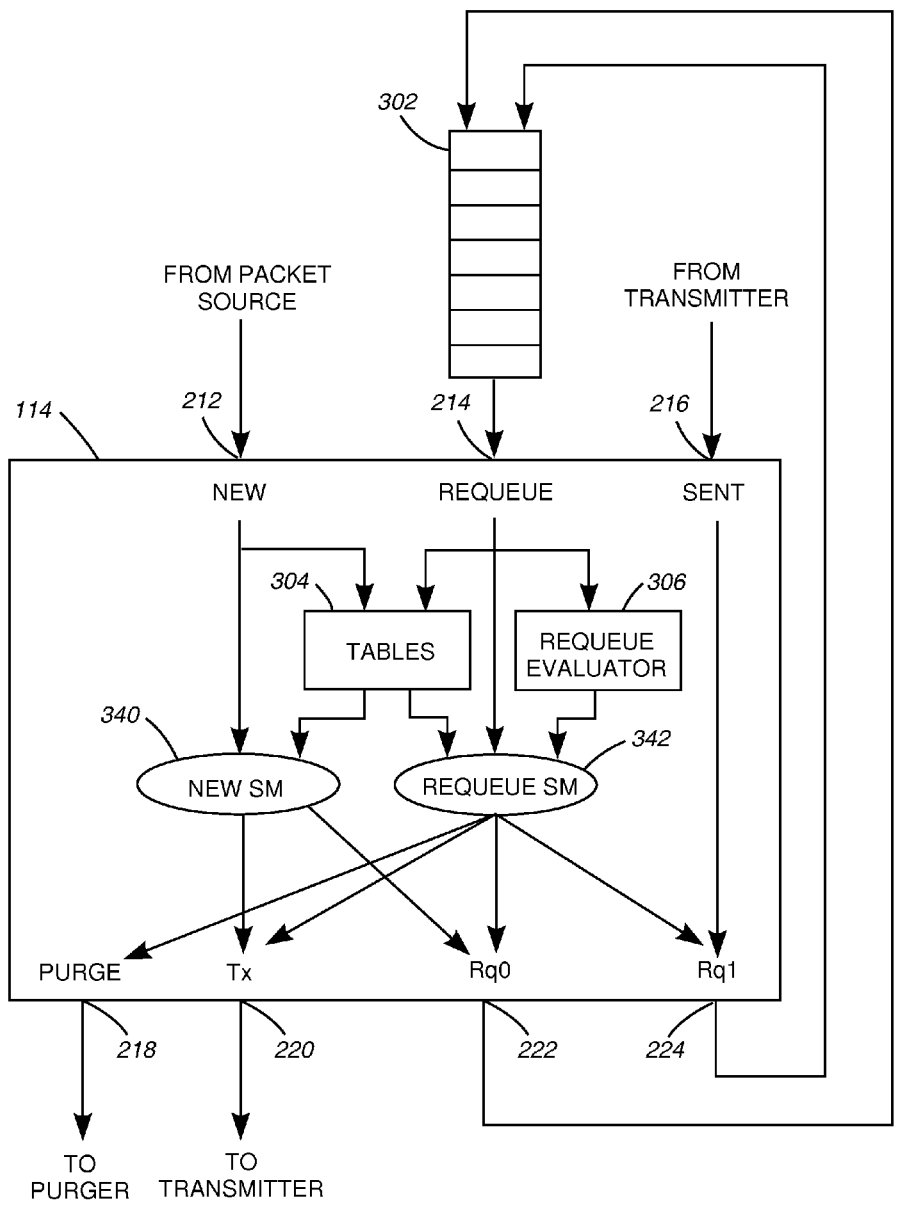
FIG. 3 is a detailed view of the data packet dispatch module of FIG. 2 according to one embodiment of the present invention.

FIG. 3 is a block diagram showing a more detailed view of the packet dispatch module 114. The packet dispatch module 114, in one embodiment, allows for the reliable transmission and/or re-transmission of data packets across a network such that the packets ultimately remain in a specific order despite potentially being damaged or discarded in the network. The packet dispatch module 114 performs this transmission processing by using a single FIFO buffer as discussed below. The packet dispatch module 114 can receive a plurality of packet digests on multiple input ports and dispatch these packets on various output ports accordingly.

In one embodiment, the packet dispatch module 114 is communicatively coupled to a buffer 302, which, in this embodiment for example, is a shared circular multi-port FIFO buffer. This FIFO buffer 302, simultaneously, serves as:

a retry queue for data packets that require re-transmission;

a holding buffer for packets inhibited from original transmission due to network back-pressure; and/or a staging buffer for data packets that are pending disposal (purging) from the information processing system 104 due to acknowledged transmission or unrecoverable error.

In this embodiment, the re-transmission of data packets, the holding of data packets, and the actual transmission of packets can occur simultaneously. From hereon in, the FIFO buffer 302 is referred to the "requeue buffer 302". The packet dispatch module 114 and the requeue buffer 302 can also seamlessly intermix traffic of packets having an ordering contingency between them (i.e., packets of a data stream destined for the same endpoint 106, 108), as well as data packets that are ordinal independent (i.e., to different endpoints 106, 108). One advantage of the present invention is that the requeue buffer 302 is not pre-allocated or dedicated to particular endpoints or packets. In other words, the requeue buffer 302 is shared between multiple endpoints and packets. Also, the requeue buffer 302 is not limited to a number of packets that can be outstanding to any particular endpoint (besides the physical limit of the requeue buffer 302). Therefore, the present invention can be dynamically scaled for use in systems with many or few independent endpoints.

As discussed above, the packet dispatch module 114 includes a plurality of input ports 212, 214, and 216. A first input port 212 labeled "New" in FIG. 3 is an input port that receives data packets from the packet source 112. However, as discussed above, these packets are first received by the packet abbreviator 202, which sends a digest to the first input port 212. The digests received at the first input port 212 can either be sent to a transmission output port 220 where it is sent to a receiver, or to the requeue buffer 302 through an Rq0 port 222. This decision is performed by the New Packet Sequential Machine 340 of one embodiment. The digest is sent to the requeue buffer 302, in one embodiment, if the packet is not the next sequence number to go or if the device that the transmission port 220 is connect to, which can be another FIFO buffer, indicates that it is full.

If the packet needs to be purged immediately because, for example, of a data communications fence or an error, the packet is sent to the requeue buffer 302 through the Rq0 port 222 where it is later purged. The packet dispatch module 114 makes this decision based on one or more tables 304, which are discussed below in greater detail, and on information received from a retry evaluator 306. Therefore, two purge ports are not required and contention on a single purge port is avoided. This allows new packets to always be accepted, thereby preventing exerting data acceptance backpressure on the packet source 112. The retry evaluator 306 is discussed in greater detail in the co-pending application entitled "CONGESTION REDUCING RELIABLE TRANSPORT PACKET RETRY ENGINE", Serial No. 11/686,417, commonly assigned herewith to International Business Machines Corporation. The retry evaluator 306, in one embodiment, is part of a data packet retransmission module that determines when to retransmit a data packet.

A second input port 216 labeled "Sent" receives digests from the transmitter that have been completely transmitted. Transmitted packets are sent to this input port so that they can be maintained for retransmission if a problem is subsequently detected in the packet stream or so that the packets can be ultimately purged. The architecture of one embodiment of the present invention, where all of the packets come back to the dispatcher 114 via the Sent input port 216, allows limiting purge points in the system (thus reducing hardware). These "sent" packets are sent to the requeue buffer 302 through Rq1 output port 224. Packets are always accepted at the second input port 216 so that backpressure does not have to be applied to the transmitter. Because this port 216 only sends received packets to the requeue buffer 302, the packet can be immediately sent to the requeue buffer 302 without the need to retrieve additional information as previously preformed via the new Sequential Machine ("SM") 340 and the Requeue SM 342.

A third input port 214 labeled "Requeue" receives packets from the requeue buffer 302. In order to minimize holding up data flow into the other input ports, the requeue buffer input 214 has the lowest priority. This is because requeue port 214 will yield access to new port 212 when packets are coincidently received in order to avoid backpressure from packet abbreviator 202. One embodiment of the present invention operates to pull packets when possible from the requeue buffer 302, and not have the data pushed into the dispatcher 114 when available packets from the requeue buffer 302 are ready. Packets received through the requeue input port are controlled by the retry evaluator 306 and the Requeue Sequential Machine 342.

If the packets from the requeue buffer 302 that are received through the requeue input 214 were never sent out by the transmitter in the first place, or if the particular packet needs to be resent, the packet is be sent out the Tx port if possible. If the packet is not ready to be sent and cannot be purged because it has not been acknowledged yet, it must be held on to. The dispatcher tries to use Rq0 output 222 and if Rq0 output 222 is not being used by the New input port 212, then Rq0 output 222 is used. Otherwise, the packet tries Rq1 output 224 and if Rq1 output 224 is not being used, for example, by data received through the Sent port, then Rq1 output 224 is used. If both Rq0 and Rq1 output ports 222, 224 are being used, data received from the requeue port 214 is halted. And finally, if the packet has been acknowledged then it is sent to the purge port. Again, this decision is made based on information from the tables 304, the retry evaluator 306, as processed by the requeue SM 342 discussed below.

The packet dispatcher 114, in this embodiment, includes four output ports 218, 220, 222, 224. The first output port 218 labeled "Purge" in FIG. 3 is used to free up buffer space in the main packet buffer 204. Packets are sent to this port after they have been acknowledged or otherwise need to be discarded. The second output port 220 labeled "Tx" is the output port to a data transmitter where packets go to be transmitted to their respective endpoint. The Tx port 220 also has a "full" input signal so that if the downstream mechanism cannot accept any more packets, the full input signal is asserted and no packets are sent. All packets are then sent to the requeue buffer 302, due to routing by the new SM 340 of newly received packets through the Rq0 output 222, until this signal is dropped. In an example where an input FIFO of the transmitter is connected to the Tx port 220, the full indicator of the transmitter's input FIFO is connected to the full signal input of the Tx port 220. In a data packet manager with more than one transmit port, packets to one output port are processed via the transmission port 220 while packets to another port (blocked) are requeued at Rq0 222, thus preventing one output port from blocking another. In one embodiment, there is one full input signal per port. After the packet has been put out on the network, the transmitter in this embodiment sends the digest back to the Sent input port 216 to have the packet placed into the requeue buffer 302 via port Rq1 224 to support retransmission processing. The third output port 222 labeled "Rq0" and the fourth output port 224 labeled "Rq1" are ports where packets are pushed onto the two input ports of the requeue buffer 302.

The requeue buffer 302, in one embodiment, includes two write ports and one read port. In other words, two packet-digests can be pushed onto the requeue buffer 302 at the same time and one packet is pulled from the requeue buffer 302 at a time. When two packets are pushed onto requeue buffer 302 at the same time, it is not important which packet is first in the requeue buffer 302 since the packets are sequentially organized in the requeue buffer 302 by the packets' sequence numbers. In other words, the order of the packets in the requeue buffer 302 is trivial. The depth of the requeue buffer 302 is equal to the maximum number of outstanding packets.

All three data input paths (New, Requeue, and Sent) are constantly running simultaneously, where the New 212 and Send 216 input ports are never blocked. For example, a packet from the packet source 112 can come in on the New port 212 and go out the Tx port 220 while a packet from the transmitter can come in on the Sent port 216 and go out the Rq1 port 224 This can occur while a packet from the requeue buffer 302 comes in on the Requeue port 214 and goes out the Rq0 port 222. Another example is a packet from the packet source 112 coming in on the New port 212 and going out on the Rq0 port 222 while a packet from the transmitter comes in on the Sent port 216 and goes out the Rq1 port 224. This can occur while a packet from the requeue buffer 302 comes in on the Requeue port 214 and goes out on the Purge port 218. All of the above occurrences are able to happen simultaneously in some embodiments. In other words, the packet dispatch module 114 can handle multiple packet actions at a time by operating on each packet presented to it simultaneously.

As discussed above, dispatching decisions (send to purge port, transmission port, requeue ports, and the like) are made by the packet dispatch module 114 based on tables 304, the retry evaluator 306, and information received in a packet. The set of tables 304 can include an Assigned Sequence Number ("SQN") table comprising a SQN for each endpoint 106, 108 or node in the network system 100. This SQN is assigned to the next packet sent in on the New port 212 for this node. When a given SQN is assigned, that entry in the SQN table for that node is incremented so the next packet receives the subsequent SQN. The SQN table assures that packets are ordered the same way in which they enter the packet dispatch module 114.

Another table within the table set 304 is a Next to Go SQN table. This table also holds a SQN for each node. The SQN stored in the next to go SQN table indicates which packet is the next in line to be transmitted to its corresponding node. This insures that the packets are transmitted in the correct order. An End to End SQN table can also be included in the set of tables 304. This table also holds a SQN for each node and indicates the SQN of next packet to be acknowledged by each node. In this embodiment, when a packet with an SQN value of X from a given node is acknowledged, the corresponding entry in this table is set to X+1 by the packet dispatch module 114. When the packet dispatch module 114 is initialized, all three of these SQN tables are initialized to the same value for any active node in the network. A Node to Port Mapping table is also included in the set of table 304. This table holds one port number per node. The port number indicates which port a packet is to be transmitted through for a particular node. In a single port data packet manager, this table can be removed. A series of additional tables and decision trees for determining when to retry packets if the packet stream becomes interrupted or if there is an error can also be include in the packet dispatch module if required for a particular application. For example, see the co-pending application entitled "CONGESTION REDUCING RELIABLE TRANSPORT PACKET RETRY ENGINE", Ser. No. 11/686,417, commonly assigned herewith to International Business Machines Corporation, the entire contents of which are hereby incorporated herein by reference.

When packets arrive on the New port 212, the packet dispatch module 114 assigns a SQN from the assigned SQN table to each of the received packets. The packet dispatch module 114 then updates the SQN table. The packet dispatch module 114 then retrieves the Next To Go SQN table, Node to Port Mapping table, and retry information. Once this information is retrieved, the packet dispatch module 114 determines whether the packet is to be transmitted/retransmitted, or placed into the requeue buffer 302 (as further discussed with respect to FIG. 5). The packet dispatch module 114 pipelines packets so that more packets can be received while the information is being retrieved for other packets.

An example of a retry processing technique that can utilize an embodiment of the present invention is discussed below. This technique is described in more detail in co-pending application entitled "CONGESTION REDUCING RELIABLE TRANSPORT PACKET RETRY ENGINE", Serial No. 11/686,417, commonly assigned herewith to International Business Machines Corporation. This example is used to describe the operation of one embodiment of the present invention, and is in no way limiting. This example defines establishing a communications path to a remote node where the path has several modes are status values, as is referred to below.

If a node is associated with a "Normal" transmission mode and the assigned SQN matches the next to go SQN for this node, the packet is sent to the Tx port 220 provided there is no full indication from the transmit port connected to Tx port 220 to which the packet is destined. Otherwise the packet is sent to Rq0 222 so that it can be placed in the requeue buffer 302, and the next to go sequence number is not advanced. A "Normal" transmission mode allows for the transmission of packets to a node without waiting for an immediate acknowledgement until the limit of number of outstanding packets is reached. Another mode is a "Retry" mode where retransmission of missing packets is limited to only the first one missing and waiting for a response to it. Only then does it proceed to send all outstanding packets until it detects a packet that has not been transmitted, at which time it reverts back to its normal transmission mechanism. Yet another transmission mode is a "Dead" mode, where retransmissions of a packet to the node are stopped, and either a new transmission route is selected or error recovery procedures are performed. The transmission modes of this example are further discussed in the co-pending application entitled "CONGESTION REDUCING RELIABLE TRANSPORT PACKET RETRY ENGINE", Ser. No. 11/686,417, commonly assigned herewith to International Business Machines Corporation.

The packet dispatch module 114 updates the next to go SQN table for a given node of any packet leaving the transmission port 220 to properly identify the next packet to send. In one embodiment, an action decision for packets from the sent port 216 is trivial since they are always sent to the Rq1 output 224. In one embodiment, the packet dispatch module 114 pulls packets from the requeue buffer 302 if the pipeline is not halted due to contention with the New 212 or Sent 216 ports. Data from the Next To Go SQN table, the end to end SQN table, and the node to port mapping table for the packet pulled from the requeue input 214 are retrieved along with any retry information for that packet. Based upon this retrieved information, an action decision is determined by the packet dispatch module 114 for the pulled packet. If an Attention signal from the retry evaluator 306 is asserted indicating that the requeue FIFO has a candidate packet for retry, then the Tx output port 220 is checked to determine availability. Otherwise, the Rq0 output port 222 and the Rq1 output port 224 are similarly checked for availability.

If the requeue SM 342 tries to send out a packet from 214 on the Tx port 220, the requeue SM 342 determines if the New input port 212 is attempting to use the TX port 220 as well. If the New input port 212 is not using the Tx port 220, then the packet on 214 is sent to the Tx port 220 and the Next To Go SQN table is updated. Otherwise, the requeue input 214 is frozen. If the requeue input 214 needs to be sent back to the requeue buffer 302, the requeue SM 342 determines if the New input port 212 is attempting to use the Rq0 output port 222. If the New input port 212 is not trying to use the Rq0 port 222, then the requeue pipe uses the Rq0 port 222. Otherwise, the requeue pipe determines if the Sent port 216 is trying to use Rq1 port 224. If the Sent port 216 is not using the Rq1 port 224 then the requeue pipe uses the Rq1 port 224, otherwise, the requeue pipe is frozen.

If the requeue input must be frozen due to output port or table read contention, then new packets are not pulled from the requeue buffer 302 until the contention is resolved; any pending table accesses are maintained (stored internally). The data packet dispatch module 114 discussed above is able to be replicated so that if multiple lanes of traffic to any given node are desired, then multiple copies of the packet dispatch module 114 can be instantiated. Each lane operates independently and has its own tables of sequence numbers and other information. Some information such, as the retry states, may be global across all lanes. Such replication may utilize an arbitration module between the multiple dispatchers.

If multiple dispatchers exist for different lanes, the traffic is able to be ordered on its own lane only. However, if an application has a type of packet that cannot have any other packets (regardless of lane) pass it, then a mechanism to hold all traffic behind that blocking packet can be established. In such a case, the packet dispatch module that receives the blocking packet informs all other packet dispatch module that they cannot send any new packets until the acknowledgement for the blocking packet has been received. In this case, all other packet dispatch modules hold all new packets in the requeue buffer 302 until such a condition is met.

The packet dispatch module can also be used for an unreliable traffic lane as well. In such an application, only the new input port 212, purge port 218 and Tx output port 220 are used, all SQN tables can be removed. The only other difference is that instead of sending new packets to the Rq0 222 port if they need to be held, the packet dispatch module 114 sends new packets to the purge port 218. This creates a packet dispatch module that sends packets when possible, but if there is no room for transmission, the packet is dropped.

Exemplary Information Processing System

Figure 4:
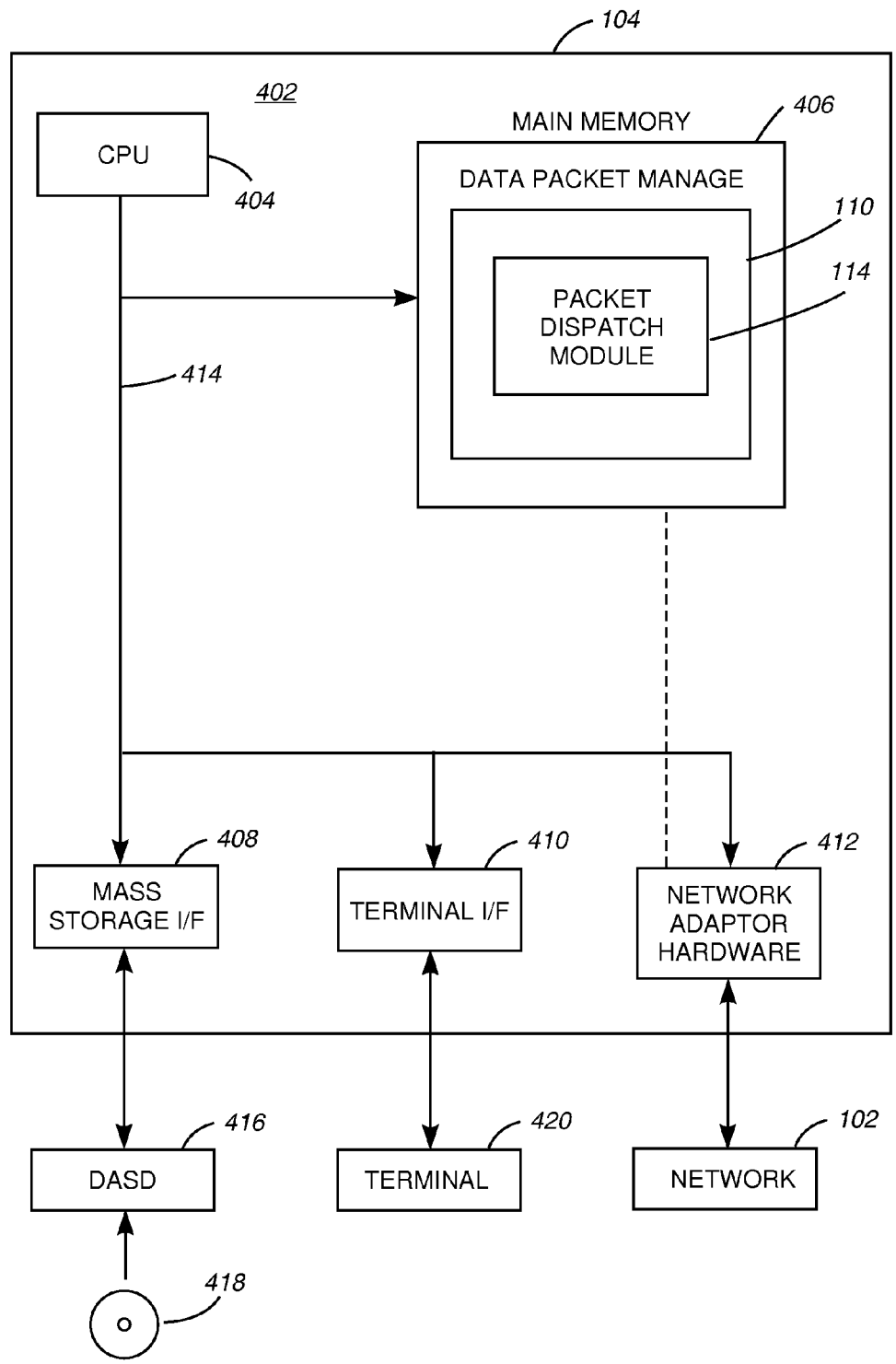
FIG. 4 is a detailed view of the information processing system of FIG. 1 according to an embodiment of the present invention.

FIG. 4 is a block diagram illustrating a more detailed view of the information processing system 104 of FIG. 1. The information processing system 104 is based upon a suitably configured processing system adapted to implement the exemplary embodiment of the present invention. Any suitably configured processing system is similarly able to be used as the information processing system 104 by embodiments of the present invention, for example, a personal computer, workstation, or the like.

The information processing system 104 includes a computer 402. The computer 402 has a processor 404 that is communicatively connected to a main memory 406 (e.g., volatile memory), mass storage interface 408, a terminal interface 410, and network adapter hardware 412. A system bus 414 interconnects these system components. The mass storage interface 408 is used to connect mass storage devices, such as data storage device 416 to the information processing system 104. One specific type of data storage device is a computer readable medium such as a CD drive, which may be used to store data to and read data from a CD 418 or DVD or floppy diskette (not shown). Another type of data storage device is a data storage device configured to support, for example, fixed disk type file system operations.

The main memory 406, in one embodiment, includes the data packet manager 110, As discussed above the data packet manager includes the packet dispatch module 114. In this embodiment, the packet dispatch module is implemented as software that is used by hardware components. The components of the packet dispatch module 114 shown in FIG. 2 are not repeated in FIG. 4 for simplicity. In another embodiment, the packet dispatch module 114 can be implemented as hardware. For example, in one embodiment, the packet dispatch module can reside within the network hardware adapter 412. In one embodiment, the information processing system 104 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the information processing system 104

Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. Terminal interface 410 is used to directly connect one or more terminals 420 to computer 402 to provide a user interface to the computer 402. These terminals 420, which are able to be non-intelligent or fully programmable workstations, are used to allow system administrators and users to communicate with the information processing system 104. The terminal 420 is also able to consist of user interface and peripheral devices that are connected to computer 402 and controlled by terminal interface hardware included in the terminal I/F 410 that includes video adapters and interfaces for keyboards, pointing devices, and the like.

An operating system (not shown), according to an embodiment, can be included in the main memory 406 and is a suitable multitasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 412 is used to provide an interface to the network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk, CD-ROM 418, or other form of recordable media, or via any type of electronic transmission mechanism.

Exemplary Process for Dispatching a New Data Packet

Figure 5:
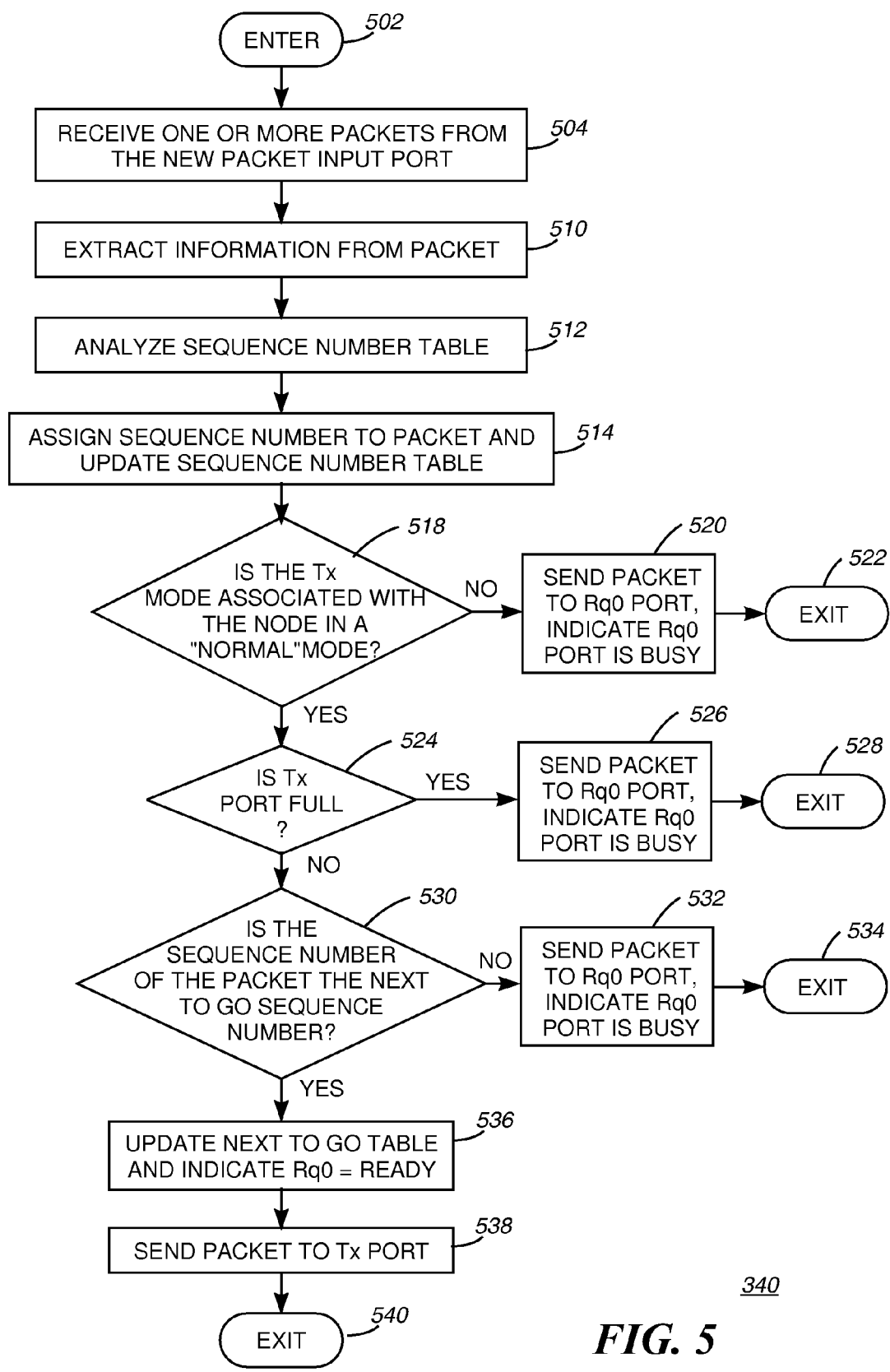
FIG. 5 is an operational flow diagram illustrating an exemplary process of determining how to dispatch a new data packet according to an embodiment of the present invention.

FIG. 5 illustrates an exemplary process for determining how to dispatch a new data packet. The operational flow diagram of FIG. 5 begins at step 502 and flows directly to step 504. The packet dispatch module 114, at step 504, receives one or more data packets from the new packet input port 212. It should be noted that the processing illustrated in the flow diagrams of FIG. 5 and FIG. 6 occur simultaneously. For example, a data packet can be received at the New input port 212 and the Requeue input port 214 at the same time. Also, as discussed above, "data packets" described for this processing flow are the abbreviated/digest data packets produced by the packet abbreviator 202.

The packet dispatch module 114 at step 510, extracts information from the data packet. For example, a node designator associated with the node that is to receive the packet can be extracted. The packet dispatch module 114, at step 512, analyzes one or more dispatch tables 304 such as assigned sequence number table. This table is analyzed so that the packet dispatch module 114, at step 514, can assign a sequence number to the data packet and update the assigned sequence number table accordingly.

The packet dispatch module 114, at step 518, determines the transmission mode of the node that is to receive the packet. For example, the packet dispatch module 114, at step 518, determines if the transmission node is set to "Normal". If the result of this determination is negative, the packet dispatch module 114, at step 520 sends the packet to a requeue port such as Rq0 222 and Indicates "Busy" to the Requeue SM 342. An indication of "Busy" causes the decision at 618 in FIG. 6 to take the "Busy" path. The control flow then exits at step 522.

If the result of this determination is positive, the packet dispatch module 114, at step 524, determines if the transmission port 220 is full. If the result of this determination is positive, the packet dispatch module 114, at step 526, sends the packet to a requeue port such as Rq0 222 and indicates "Busy" to the Requeue SM 342. An indication of "Busy" causes the decision at 618, 620, 636 in FIG. 6 to take the "Busy" path. The control flow then exits at step 528. If the result of this determination is negative, the packet dispatch module 114, at step 530, determines if the sequence number of the packet equals to sequence number of the next packet to be transmitted to the node. This is determined by analyzing the next to go sequence table. If the result of this determination is negative, the packet dispatch module 114, at step 532, sends the packet to a requeue port such as Rq0 222 and indicates "Busy" to the Requeue SM 342. An indication of "Busy" causes the decision at 618, 620, 636 in FIG. 6 to take the "Busy" path. The control flow then exits at step 534. If the result of this determination is positive, the packet dispatch module 114, at step 536, updates the next to go table and indicates "Ready" to Requeue SM 342 so it can use Rq0 port 222. The packet dispatch module 114, at step 538, sends the packet to the transmission port 220. The control flow then exits at step 540.

Exemplary Process for Dispatching a Requeue Data Packet

Figure 6:
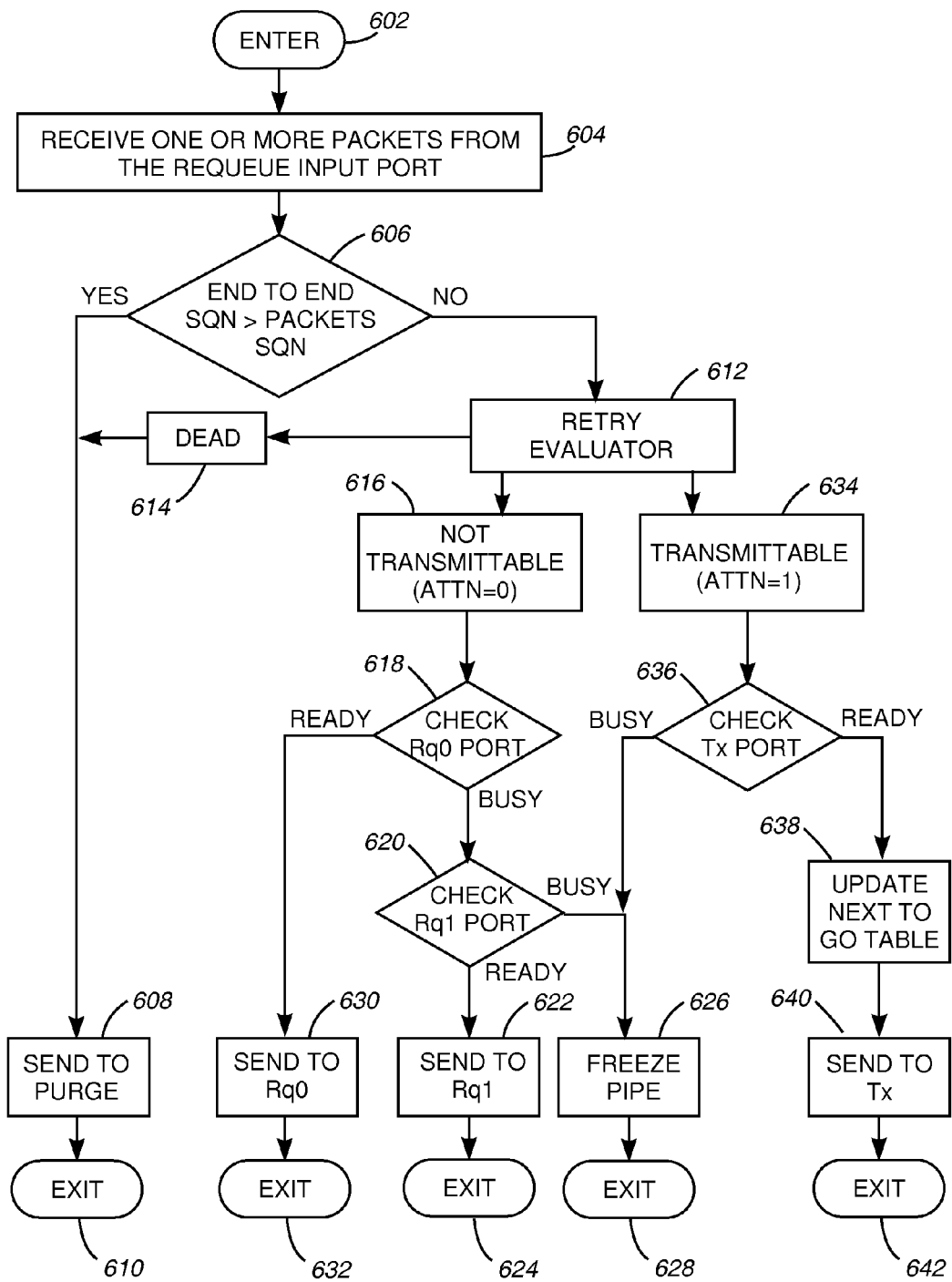
FIG. 6 is an operational flow diagram illustrating an exemplary process of determining how to dispatch a requeue data packet according to an embodiment of the present invention.

FIG. 6 illustrates an exemplary process for determining how to dispatch a requeue data packet. The operational flow diagram of FIG. 6 begins at step 602 and flows directly to step 604. The packet dispatch module 114 receives, at step 604, one or more packets from the requeue import port 214. A requeue packet is either a packet that has been transmitted but does not have an associated acknowledgement packet or a packet that was received but was not able to be sent at that time.

The packet dispatch module 114, at step 606, analyzes the end to end sequence number table and determines if the sequence number of the next packet expected to be acknowledged is greater than the sequence number of the received requeued packet. If the result of this determination is positive, the packet dispatch module 114, at step 608, sends the packet to the purge port 218 and the control flow exits at step 610. If the result of this determination is negative, the packet dispatch module 114, at step 612, analyzes the decision of the retry evaluator 306. If Based on the analysis at step 612, the packet dispatch module 114, at step 614, determines that the transmission mode associated with the node that is to receive that packet is a "Dead" mode and the control flows to step 608 where the packet is sent to the purge port 218. The control flow then exits at step 610. However, if the packet dispatch module 114, based on the analysis at step 612, determines, at step 616, that a "not transmittable" packet exists, the packet transmit module 114 determines, at step 618, the status of the Rq0 requeue port 222.

If the Rq0 port 222 is busy such as that indicated by steps 520, 526, and 532 of FIG. 5, the packet dispatch module 114, at step 620, determines the status of the Rq1 requeue port 224. If the status of the Rq1 requeue port is ready, the packet dispatch module 114, at step 622, sends the packet to the Rq1 port 224. The control flow then exits at step 624. If the status of the Rq1 port 224 is busy, the packet dispatch module 114, at step 626, freezes the Rq1 port 224 and the control flow exits at step 628. Returning back to step 618, if the status of the Rq0 port is ready, the packet dispatch module 114, at step 630, sends the packet to the Rq0 port 222 and the control flow exits at step 632.

Returning to step 612, if the packet dispatch module 114, at step 634 determines that a "transmittable" mode exists, the packet dispatch module 114, at step 636 determines the status of the transmission port 220. If the status of the transmission port 220 is busy, the control flows to step 626 where the transmission port is frozen. If the status of the transmission port 220 is ready, the packet dispatch module 114, at step 638, updates the next to go table and sends the packet to the transmission port 220 to be transmitted at step 640. The control flows then exits at step 642. It should also be noted that if a packet comes via the transmitter 216, the packet goes into the Requeue buffer 302 via Rq1 port 224 and Rq1 indicates "busy" to the requeue SM 342 via step 620.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, on an information processing system, for managing transmission of data packets across a network, the method comprising:
   maintaining a retry buffer, the retry buffer comprising of a single first in, first out retransmission retry buffer that stores a plurality of data packets including ordering information via a packet sequence number for each data packet within the plurality of data packets;
   inserting, in response to transmitting a first data packet to a remote node, the first data packet into the retry buffer;
   receiving a second data packet directly from a data source that originated the second data packet;
   determining, in response to receiving the second data packet and prior to the second data packet being inserted into the retry buffer, that the second data packet is not able to be transmitted to the remote node;
   inserting, in response to determining that the second data packet is not able to be transmitted to the remote node, the second data packet into the retry buffer;
   retrieving, from the retry buffer, a third data packet;
   determining, after retrieving the third data packet from the retry buffer, that third data packet is not to be transmitted to the remote node; and
   reinserting, in response to determining that the third data packet is not to be transmitted to the remote node, the third data packet into the retry buffer.

2. The method of claim 1, wherein determining that the third data packet is not to be transmitted to the remote node comprises determining an acknowledgement timeout for a transmitted packet corresponding to the third data packet.

3. The method of claim 1, wherein determining that the second data packet is not able to be transmitted to the remote node comprises determining that a transmitter port is busy.

4. The method of claim 1, further comprising:
   determining that the third data packet is to be purged; and
   purging, in response to determining that the third data packet is to be purged, the third data packet.

5. The method of claim 1, wherein the retry buffer comprises a first input port and a second input port and one output port, wherein the first data packet is able to be inserted into the retry buffer only through the first input port, and the third data packet is able to be inserted into either the first input port or the second input port.

6. The method of claim 1, wherein at least one of the first packet and third packet, first packet and the second packet, and the second packet and the third packet can be simultaneously pushed onto the retry queue.

7. The method of claim 5, wherein the second data packet is able to be inserted into the retry buffer only through the second input port.

8. The method of claim 1, wherein the second data packet is assigned a sequence number.

9. The method of claim 8, further comprising:
   determining that the second data packet is able to be transmitted to the remote node;
   determining that the remote node is in a "normal" state and that the assigned sequence number is equal to a next-to-go sequence number; and
   transmitting, in response to the determining that the node is in a "normal" state and that the assigned sequence number is equal to a next-to-go sequence number, the second data packet to the remote node via a transmission port.

10. The method of claim 1, wherein the second packet subsequently becomes a next first packet and is sent to a first input port.

11. The method of claim 10, further comprising:
    determining at least one of that the second data packet is able to be transmitted to the remote node, that the node is not in a "normal" state, and that the assigned sequence number is not equal to a next-to-go sequence number; and
    inserting, in response to the determining, the second packet in the retry buffer via a second input port so that the second packet can be transmitted at later point in time.

12. The method of claim 1, further comprising:
    receiving the third data packet on a second input port from the retry buffer.

13. The method of claim 12, further comprising:
    analyzing a dispatch sequence number associated with the third data packet;
    determining, in response to the analyzing, that a dispatch sequence number associated with a next data packet to be acknowledged by the remote node destined to receive the third data packet is one of less than and equal to the sequence number associated with the second data packet; and receiving a retransmit signal associated with the third data packet.

14. The method of claim 13, wherein the receiving further comprises:

analyzing a transmission port;

determining that the transmission port is ready to transmit a data packet to the remote node destined to receive the third data packet; and retransmitting, in response to the determining, the third data packet to the remote node via the transmission port.

15. An information processing system for managing transmission of data packets across a network, the information processing system comprising:

a memory;

a processor communicatively coupled to the memory; and a data packet manager communicatively coupled to the memory and the processor, the data packet manager for;

maintaining a retry buffer, the retry buffer comprising of a single first in, first out retransmission retry buffer that stores a plurality of data packets according to a respective packet sequence number for each data packet within the plurality of data packets;

inserting, in response to transmitting a first data packet to a remote node, the first data packet into the retry buffer;

receiving a second data packet directly from a data source that originated the second data packet;

determining, in response to receiving the second data packet and prior to the second data packet being inserted into the retry buffer, that the second data packet is not able to be transmitted to the remote node;

inserting, in response to determining that the second data packet is not able to be transmitted to the remote node, the second data packet into the retry buffer;

retrieving, from the retry buffer, a third data packet;

determining, after retrieving the third data packet from the retry buffer, that the third data packet is not to be transmitted to the remote node; and reinserting, in response to determining that the third data packet is not to be transmitted to the remote node, the third data packet into the retry buffer.

16. The information processing system of claim 15, wherein determining that the third data packet is not to be transmitted to the remote node comprises determining an acknowledgement timeout for a transmitted packet corresponding to the third data packet.

17. The information processing system of claim 15, wherein determining that the second data packet is not able to be transmitted to the remote node comprises determining that a transmitter port is busy.

18. A non-transitory signal computer readable medium for managing transmission of data packets across a network, the non-transitory signal computer readable medium comprising instructions for:

maintaining a retry buffer, the retry buffer comprising of a single first in, first out retransmission retry buffer that stores a plurality of data packets according to a respective packet sequence number for each data packet within the plurality of data packets;

inserting, in response to transmitting a first data packet to a remote node, the first data packet into the retry buffer;

receiving a second data packet directly from a data source that originated the second data packet;

determining, in response to receiving the second data packet and prior to the second data packet being inserted into the retry buffer, that the second data packet is not able to be transmitted to the remote node;

inserting, in response to determining that the second data packet is not able to be transmitted to the remote node, the second data packet into the retry buffer;

retrieving, from the retry buffer, a third data packet;

determining, after retrieving the third data packet from the retry buffer, that the third data packet is not to be transmitted to the remote node; and reinserting, in response to determining that the third data packet is not to be transmitted to the remote node, the third data packet into the retry buffer.

19. The non-transitory signal computer readable medium of claim 18, wherein the instructions for determining that the second data packet is not able to be transmitted to the remote node further comprise instructions for determining that a transmitter port is busy.

20. The non-transitory signal computer readable medium of claim 18, wherein the retry buffer comprises a first input port and a second input port and one output port, wherein the first data packet is able to be inserted into the retry buffer only through the first input port, and the third data packet is able to be inserted into either the first input port or the second input port.

* * * * *